INVENTOR.
LLOYD J. BANASZAK
BY
*P. H. Firsht*
ATTORNEY.

United States Patent Office 3,136,872
Patented June 9, 1964

3,136,872
GAS OPERATED IGNITION SWITCH FOR A MULTI-STAGE ROCKET PROPELLED MISSILE
Lloyd J. Banaszak, China Lake, Calif., assignor to the United States of America as represented by the Secretary of the Navy
Filed July 23, 1962, Ser. No. 211,922
3 Claims. (Cl. 200—82)
(Granted under Title 35, U.S. Code (1952), sec. 266)

The invention herein described may be manufactured and used by or for the Government of the United States of America for governmental purposes without the payment of any royalties thereon or therefor.

The present invention relates to a pressure actuated switch; and more particularly to a pressure actuated switch which serves either as a "safe arming" device or in a "control firing" circuit, as dictated by the environmental conditions, for controlling the sequential ignition of solid propellant grains in a multi-stage, far-reaching rocket missile of the type having infra-red devices provided for guiding the missile to its target.

In the design and operation of far-reaching guided missiles of the type utilizing solid propellant grains and infra-red guidance devices, it has been found necessary to maintain the velocity of the missile within a range of such magnitude as is necessary to propel the missile to its target yet not exceed the velocity at which atmospheric friction will heat the skin of the missile to such a degree as to cause the skin of the missile to generate infra-red rays and thus subject the infra-red guidance device to undesirable radiation which will cause the device to become "blind" and incapable of performing a proper guidance function.

It has, heretofore, been the general practice to provide a combination of shutter and inertial type switches to achieve a sequential ignition of the solid propellant grains to develop and sustain a desired velocity. Although the prior art devices have served the purpose, they have not proved entirely satisfactory for the reasons that each of the devices comprises numerous moving parts directly exposed to the corrosive effects of the hot gases of combustion, generated by the burning of the propellant grains, with the attendant result of a high percentage of failures.

It is therefore an object of the present invention to provide a means for insuring the operation of the infra-red guidance device utilized in multi-stage solid fuel rocket propelled missiles.

Another object is to provide a device for accurately controlling the sequential ignition of successive stages of multi-stage rocket propelled missiles in flight.

A further object is to provide means for accurately controlling the velocity of multi-stage missiles.

Still another object is to provide a pressure actuated switch which is operable at a location remote from the pressure source.

Other objects, advantages and novel features of the invention will become apparent from the following detailed description of the invention when considered in conjunction with the accompanying drawings wherein:

FIG. 4 is an end view, partly in section, taken generally along line 4—4 of FIG. 3;

FIG. 5 is an exploded perspective view of certain of the parts shown in FIGS. 2–4; and FIG. 6 is a graphic illustration of pressure and velocity changes plotted against time.

Figure 1:
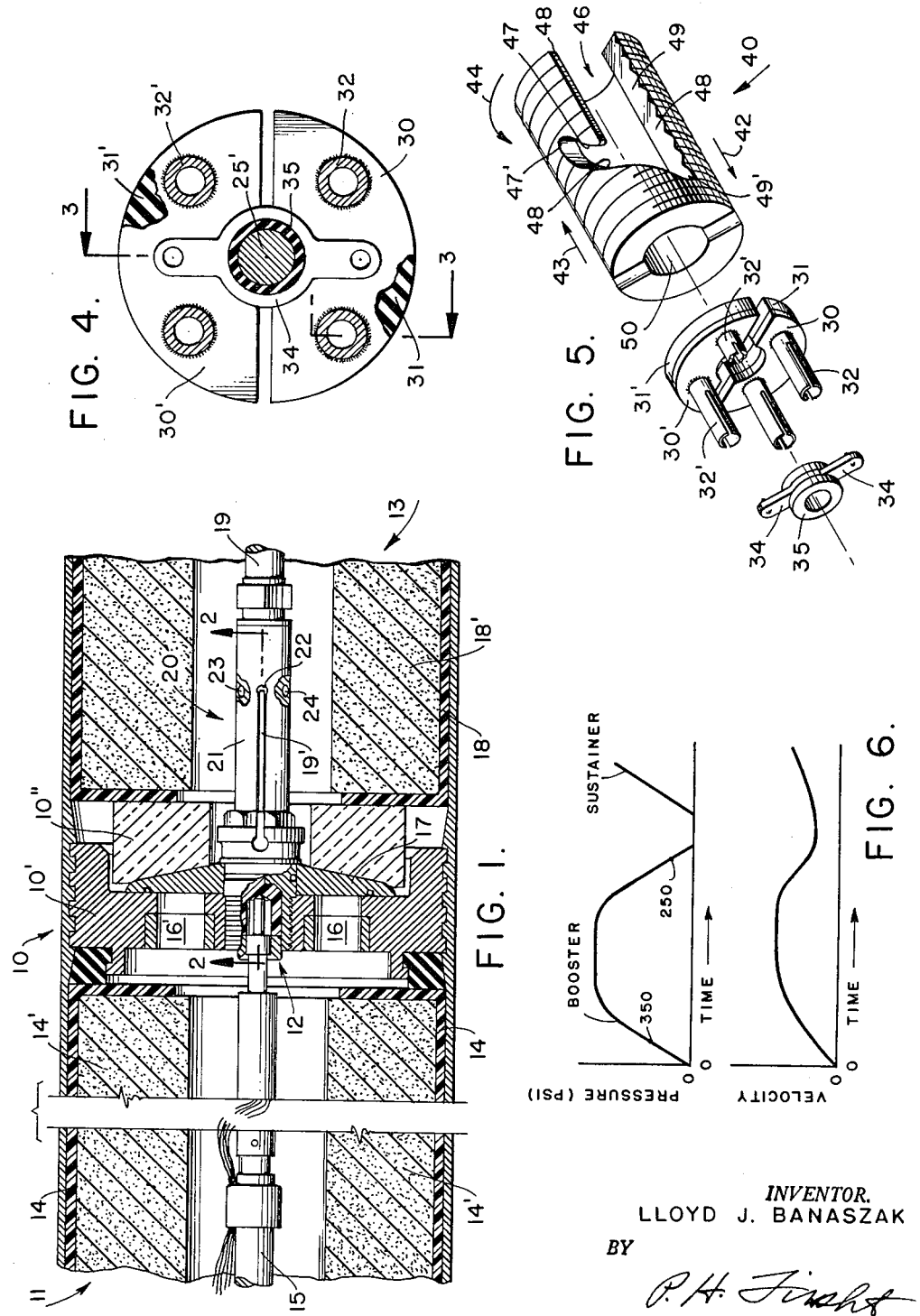
FIG. 1 is a fragmentary cross sectional view of a portion of a rocket motor taken generally along the longitudinal axis thereof.

Referring now to the drawings, wherein like reference characters designate like or corresponding parts throughout the several views, there is shown in FIG. 1 a portion of a rocket motor 10 having a sustainer stage, generally designated by the reference numeral 11, and a booster stage, generally designated by the reference numeral 13, separated by a bulkhead 10'. The sustainer and booster stages are provided with an annular connector 12 of the type disclosed in co-pending application Serial No. 198,651, filed May 29, 1962, now U.S. Patent No. 3,112,615, which includes an insulated plug 12' for electrically connecting the two stages of the rocket motor. The sustainer stage 11 contains a solid grain propellant assembly 14 having therein a quantity of solid grain propellant 14' and is provided with an igniter 15 which serves to ignite the solid grain propellant at a proper and given time. Disposed in the bulkhead 10' adjacent the aft end of the sustainer stage are flame or exhaust ports 16 and 16' through which the exhaust gases of the stage are directed. At the forward end of the booster stage, and adjacent the aft end of the sustainer stage, there is arranged an expendable assembly disk 17, a specific description of which is not deemed necessary as it forms no part of the present invention.

The booster stage 13 of the rocket must perform a propelling function and must be sufficiently consumed prior to the ignition of the propellant 14' disposed in the sustainer stage 11 of the rocket motor. In order to perform this function, booster stage 13 is provided with a support 10" for a solid grain propellant assembly 18 having therein a quantity of solid grain propellant 18'. The booster stage is provided with an igniter 19 and ignition lead 19' which serve to selectively ignite the propellant grain 18' either at the completion of the operation of a prior stage of the missile, if such a stage is provided in the missile, or at the initial firing ignition of the missile, as is found desirable. For activating the sustainer stage igniter 15 there is disposed within the forward end of the booster stage 13 a pressure actutated switch, generally designated by reference numeral 20, which controls the ignition of the propellant 14' in the sustainer stage of the missile. Switch 20 is actuated under the dictates of the pressure differential created by the combustion of the propellant 18' in the booster stage 13 of the rocket motor. The pressure switch 20 comprises a switch housing 21 in which a plurality of pressure ports 22, 23 and 24 are formed, as shown in FIG. 1.

Figure 2:
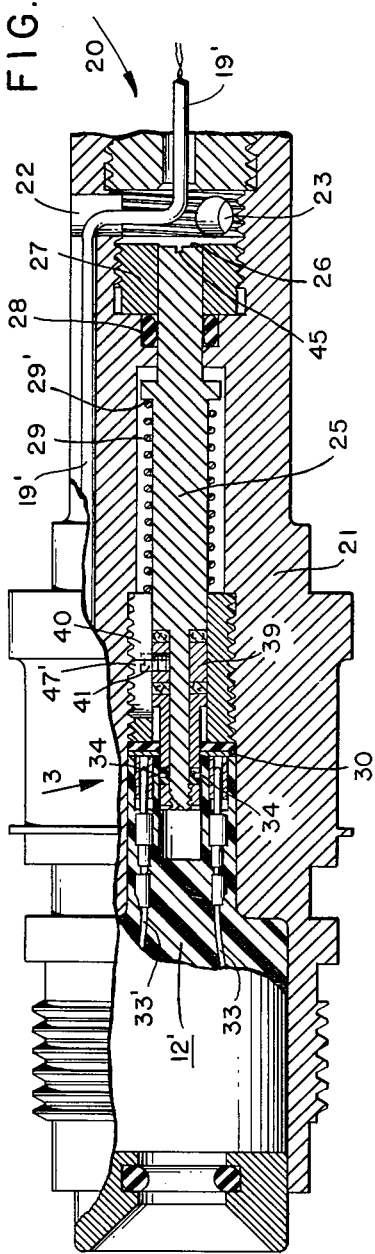
FIG. 2 is a sectional view, on a larger scale, taken generally along line 2—2 of FIG. 1 with the switch device of the invention shown in safe position.

Turning now to FIG. 2, within housing 21 there is disposed an axially movable piston 25 having a pressure impinging surface 26 disposed at the aft end thereof adjacent the pressure ports 22—24, whereby pressure admitted through the ports impinges thereagainst and imparts a longitudinal axial movement to the piston. In order to confine the pressure as it impinges against the surface 26, there is provided adjacent the surface a threaded sealing plug 27 and an O-ring seal 28 so disposed as to surround the end portion of the piston in sealing relation therewith. Piston 25 is constantly biased in a direction which urges the surface 26 toward the pressure ports 22—24. The bias is imparted through a spring 29 which surrounds a portion of the piston 25 and which is of a known value for acting against a shoulder 29' provided on the piston. The spring is located within the housing 21 and may be secured in operative relationship with the shoulder 29' by a cam member 40 which is threaded into the housing 21.

Figure 3:
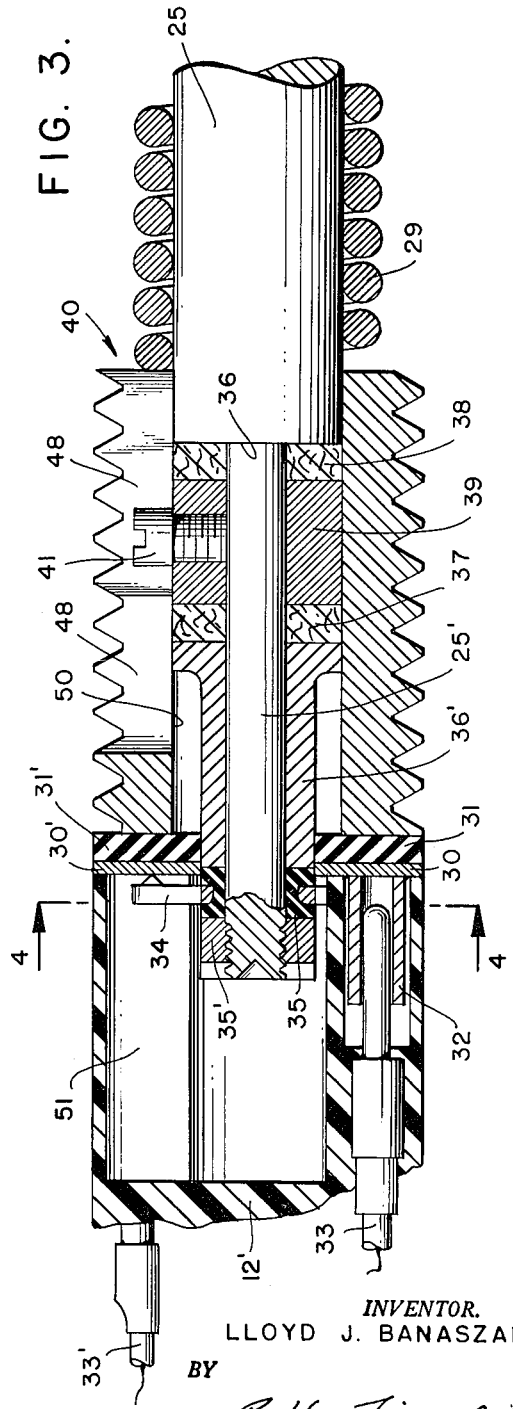
FIG. 3 is an enlarged showing of a portion of FIG. 2 but with the switch in closed position and the section taken generally along lines 3—3 of FIG. 4.

As seen in FIG. 3, there is located at the end of the piston 25 opposite the pressure impinging surface 26 a pair of electrical contacts 30 and 30′ mounted on insulators 31 and 31′, respectively, and spaced from each other in surrounding relationship with and along a reduced portion 25′ of the piston 25. The contacts are provided with female receptacles 32 and 32′ mounted thereon to receive male probes for electrical leads 33 and 33′ which constitute a portion of the sustainer ignition circuit which is open at the spaced contacts 30 and 30′.

To close the circuit between the contacts 30 and 30′ a bridging element 34 is provided for contacting both surfaces simultaneously, see FIG. 4. The bridging element 34 is mounted on the piston 25 at the outer end of the reduced portion 25′ in operative relationship with the contacts 30 and 30′ by means of an insulator ring 35 formed of rigid insulating material, whereby the element 34 is disposed in an insulated and fixed relationship with respect to the piston 25 as shown in FIG. 3. The specific manner in which the insulator ring 35 is mounted on the piston will subsequently be described in conjunction with the mounting of the remaining elements which are disposed on the reduced portion 25′. It is important only that it be understood that the insulator ring is so fixed relative to the piston 25 that longitudinal movement imparted to the piston will likewise be imparted to the insulator ring, and hence to the bridging element 34 so that the element 34 may be moved into and out of engagement with the contacts 30 and 30′ to open and close the circuit through the axial movement of the piston previously described. As the spring 29 serves normally to bias the piston rearwardly, or toward the aft end of the housing 21, the element 34 located at the outer forward end of the portion 25′ is also normally biased toward the contact surfaces 30 and 30′ which are located along the reduced portion 25′ of the piston 25. However, it is undesirable for the element 34 to be permitted to engage the contacts 30 and 30′ to thus bridge the space therebetween until such time as it is necessary to close the ignition circuit of the sustainer stage which time occurs at the completion of the effective operation of the booster stage of the rocket motor.

To achieve the desired control over the movement of the piston, and hence the bridging element 34, there is provided a cam member 40, having therein formed a cam surface 48, and a cam follower 41 in operative relationship therewith; FIGS. 2 and 3. The cam surface 48 is provided along a segmented slot 46 having diverging segments 47 and 49 arranged in the wall of member 40 which is provided with an axially extending bore 50 for receiving the reduced portion 25′ of the piston. The cam follower 41 is mounted on a cam-follower sleeve 39 which is disposed in axially fixed relationship along the portion 25′ of the piston 25 and is so mounted as to locate the follower 41 in the segmented slot 46 so that movements of the follower are dictated by the cam surface 48. In order to axially fix the follower sleeve 39, and hence the cam follower 41, along the portion 25′, there is provided a shoulder 36 on the piston 25, located at the point the reduced portion 25′ terminates, and adjacent the shoulder 36 there is disposed a spacer washer 38 for spacing the sleeve 39 therefrom. It may here be noted that the washer 38 is made of a leather-like material and serves as a plate clutch to limit rotation of the sleeve 39 and as a shock absorbing, or dampening, means as well as a spacing means along the portion 25′. At the opposite end of the sleeve 39 from the spacer 38 there is located another spacer washer 37 made of like material and serving in a like manner as the washer 38. The spacer washer 37 is interposed along the portion 25′ between the cam follower sleeve 39 and a spacer sleeve 36′. The spacer sleeve 36′ abuts the insulator ring 35 and serves to maintain the cam follower sleeve 39 and the bridging element 34 in a fixed and longitudinally spaced relationship. A threaded mounting nut 35′ is threaded on the extremity of the portion 25′, for maintaining the various elements thereon in "snug" relationship. It is to be understood that no significant relative movement will occur in a longitudinal direction between the cam follower sleeve 39 and the reduced portion 25′ of the piston 25, therefore, it may be seen that movement in a longitudinal direction may be imparted to the piston 25 only so long as the movement of the cam follower 41 is unobstructed and is free to move along the surface 48 of the segmented slot 46 of the cam member 40 in which it is disposed.

Referring now more specifically to the aforementioned cam slot 46, the segments 47 and 49 are provided with cam follower obstructing portions 47′ and 49′, respectively, as best shown in FIG. 5, which assist in positioning the bridging element 34 in three distinct and separate positions hereinafter referred to as a "safe" position, an "armed" position, and a "closed" position.

The three positions in which the bridging element 34 is to be located are found particularly desirable where the operation of the switch is to be effected by pressure differentials in three given pressure conditions. The element 34 is to be maintained out of contact with the contacts 30 and 30′ before ignition of the booster stage 13, however, it must be maintained in a position which will permit booster ignition and a pressure build-up on the surface 26 to a maximum value without seating the element 34 against the contacts 30 and 30′ and will then allow the element to engage and bridge the gap between the contacts to close the ignition circuit when the pressure acting on the surface 26 has diminished to a predetermined value.

In order that three positions may be imparted to the bridging element 34, the slot segment 49, of the cam slot 46, is formed to extend straight rearwardly for allowing the cam-follower 41 complete freedom of movement in a rearward direction along this segment. However, at the forward end of the slot segment 49 the surface 48 forms an obstructing portion 49′ which prevents movement of the follower in a forward direction. From the forward obstruction portion 49′, the slot segment 47 extends in a rearwardly diverging direction and terminates at a portion of the slot surface 47′ where the surface 48 forms a cam follower obstruction, as shown in FIG. 5, for limiting further movement of the follower 41 along the slot 46 in a rearward direction. Therefore, it is to be understood that the forward-most travel of the cam follower along the segmented slot 46 is obstructed by the surface 48 at the portion 49′ and the cam follower travel is obstructed by the slot surface 48 in a rearward direction only at the portion 47′ when the follower is disposed in the segment 47. Consequently, movement of the piston in a forward direction is in all instances limited by the portion 49′ of the segmented slot 46, and is limited in its rearward movement by the portion 47′ only at such time as the cam follower 41 is disposed in the segment 47 and the switch components are disposed in a "safe" position.

As previously described, the spring 29 provides a constantly applied bias for urging the piston in a rearward direction, therefore, in order for the cam follower to be located along the surface 48 at the portion 47′ of the slot segment 47 wherein the element 34 is in its "safe" position spaced from the contacts 30 and 30′, pressure must first be exerted against the surface 26 to compress the spring 29 and move the follower 41 forwardly, in the direction relative to cam member 40 as indicated by arrow 42 in FIG. 5, along the segment 49 of the slot 46 to the portion 49′, the piston and cam follower must then be rotated, in a direction indicated by arrow 44 in FIG. 5, while the pressure is being released so that the spring 29 will force the follower along the surface 48 of the segment 47, in a direction indicated by the arrow 43, to position the follower against the surface 48 at the portion 47′ with a force of a given magnitude dictated by a preselected spring value. The "safe" position is effected during assembly using a screwdriver in slot 45, FIG. 2, for applying the necessary compression and rotating forces. To maintain element 34 insulated from the receptacles, plug 12' is formed with a slot 51 which receives and guides the ends of element 34.

It is believed that the operation of the device should be apparent from the foregoing description of the various components; however, by way of summary and in order to insure that the operation of the device is fully and clearly understood, a brief résumé of the operation, utilizing the graphic illustration shown in FIG. 6, follows.

For illustrative purposes, it is assumed that the elements of the switch 20 are assembled and disposed in their "safe" position within an operatively connected missile rocket motor, and the propellant grain 18' in the booster stage of the missile is first ignited by the igniter 19 through the lead 19' at zero Time, zero Pressure, and zero Velocity, as shown in FIG. 6. As the pressure builds up in the booster stage the velocity of the missile increases, when a given value, for example 350 p.s.i., is attained, the pressure being admitted through pressure ports 22, 23 and 24 to impinge on the surface 26 causes the piston 25 to move forward against the bias of the spring 29 unseating the cam 41 follower from the "safe" position at 47', wherein the bridging element 34 is being maintained in spaced relationship with the contacts 30 and 30', whereby upon continued increase in pressure the piston may assume the "armed" position wherein the cam follower 41 is maintained against the portion 49' by the pressure impinging against the surface 26. The bridging element continues to be maintained in spaced relationship with the contact surfaces in the "armed" position during the period the booster pressure and missile velocity continue to be maintained above a predetermined value and until such time as the pressure value, with attendant reduction in the velocity of the missile, diminishes to a given value, for example 250 p.s.i. When the pressure in the booster drops to a given value, in this instance 250 p.s.i., the spring 29 forces the piston to the rear, and since the cam follower 41 has previously been positioned in the slot 46 against the surface 49' of the segment 49 it is free to move rearwardly along the segment 49 in an unobstructed manner until the bridging element 34 is seated in its "closed" position on the contact surfaces 30 and 30' to thus close the ignition circuit for the sustainer stage of the rocket motor and permits the igniter 15 through leads 33 and 33' to ignite the propellant 14' of the sustainer stage. Upon ignition of the propellant 14' in the sustainer stage of the rocket; pressure will build up in that stage forcing hot gases out the ports 16, 16', which gases then seek a way out of the rocket motor by penetrating the assembly disk 17 and support 10" and continuing through the booster stage to render the sustainer stage operative for propelling the missile, as is indicated by the graphic illustration in FIG. 6.

Obviously many modifications and variations of the present invention are possible in the light of the above teachings. It is therefore to be understood that within the scope of the appended claims the invention may be practiced otherwise than as specifically described.

What is claimed is:

1. In a system for effecting a sequential ignition of solid propellant grains in a multi-stage rocket propelled missile, a gas operated electrical switch, comprising in combination: an elongated tubular housing; means for mounting said housing in a first stage of a multi-stage rocket propelled missile; means defining a plurality of gas ports disposed adjacent a first end of said housing and adapted to provide a plurality of pressurized gas conduits for directing externally generated gases of propellant combustion possessing initially increasing and subsequently decreasing forces of pressure into an interior portion of said tubular housing; an elongated reciprocally mounted piston adapted to be initially displaced to a seated "safe" position within said housing whereby a first end thereof may be positioned adjacent said ports; means defining forces of pressure impinging on a surface formed on said piston at the first end thereof and disposed adjacent said ports, whereby increasing forces of pressure possessed by said gases directed by said ports are caused to act against said surface for operatively displacing said piston in a first direction relative to said housing from its "safe" position to a second "armed" position as said forces are caused to increase; means comprising a transversely disposed, elongated bridging element connected to said piston at its second end to extend radially from opposite sides thereof and adapted to be displaced in the first direction relative to said housing as said piston is displaced by said forces of pressure; a pair of mutually-spaced electrical contacts adapted to be connected in a propellant ignition circuit for a subsequent stage of the multi-stage rocket propelled missile to provide a normally open electrical circuit therefor; means mounting the mutually-spaced contacts of said pair in a fixed relationship with respect to said housing and adjacent opposite ends of said element in a manner such as to accommodate a simultaneous engagement between the opposite ends of said element and the contacts of said pair; biasing means adapted to continuously act against the piston for urging said piston in a second direction, opposite said first direction; piston positioning means connected with said piston for guiding the reciprocally mounted piston as it is displaced by forces of pressure from its seated "safe" position, wherein the ends of the bridging element are retained in a first displaced relationship with respect to said contacts, to the "armed" position, wherein the ends of the bridging element are retained in a second displaced relationship with respect to said contacts and against the bias of said biasing means for a determinable period dictated by the forces of pressure of said pressurized gases, and then to a "firing" position, as the piston is displaced under the influence of said biasing means upon a decrease of forces of pressures of said pressurized gases, whereby the ends of the bridging element are caused to simultaneously engage said contacts to complete said ignition circuit.

2. An electrical switch as defined in claim 1 wherein the positioning means includes: a radially extending cam follower mounted on said piston in an axially fixed relationship therewith along an axis extending longitudinally of said piston; and an operatively associated cam follower locating means.

3. A switch in accordance with claim 2, wherein the cam follower locating means comprises a hollow cam member surrounding a portion of said piston and having segmented slots therein so arranged as to constitute a diverging configuration to provide a surface for guiding and maintaining the cam follower at a first, second and third position.

References Cited in the file of this patent

UNITED STATES PATENTS

| 2,749,548 | Turner | June 12, 1956 |
| 2,874,244 | Hamblett et al. | Feb. 17, 1959 |
| 2,944,431 | Dexter | July 12, 1960 |
| 2,945,111 | McCormick | July 12, 1960 |